United States Patent
Yamato

(10) Patent No.: US 10,486,312 B2
(45) Date of Patent: Nov. 26, 2019

(54) ROBOT, ROBOT CONTROL METHOD, AND ROBOT SYSTEM

(71) Applicant: Vstone Co., Ltd., Osaka (JP)

(72) Inventor: Nobuo Yamato, Osaka (JP)

(73) Assignee: Vstone Co., Ltd., Osaka (JP)

( * ) Notice: Subject to any disclaimer, the term of this patent is extended or adjusted under 35 U.S.C. 154(b) by 209 days.

(21) Appl. No.: 15/562,935

(22) PCT Filed: Apr. 8, 2016

(86) PCT No.: PCT/JP2016/061593
§ 371 (c)(1),
(2) Date: Sep. 29, 2017

(87) PCT Pub. No.: WO2016/163530
PCT Pub. Date: Oct. 13, 2016

(65) Prior Publication Data
US 2018/0085928 A1 Mar. 29, 2018

(30) Foreign Application Priority Data
Apr. 10, 2015 (JP) ................. 2015-081032

(51) Int. Cl.
*B25J 9/00* (2006.01)
*B25J 11/00* (2006.01)
(Continued)

(52) U.S. Cl.
CPC ........... *B25J 11/001* (2013.01); *B25J 9/0003* (2013.01); *B25J 11/003* (2013.01); *B25J 13/003* (2013.01); *G06F 17/2785* (2013.01); *G06N 3/008* (2013.01)

(58) Field of Classification Search
CPC ...... B25J 9/0003; B25J 11/001; B25J 11/003; B25J 11/0005; B25J 13/003; G06F 17/2785; G06N 3/008
See application file for complete search history.

(56) References Cited

U.S. PATENT DOCUMENTS 8,200,808 B2 6/2012 Ishida
8,958,662 B1 2/2015 Grosz et al.
(Continued)

FOREIGN PATENT DOCUMENTS

JP 2001-310283 A 11/2001
JP 2003-111981 A 4/2003
(Continued)

OTHER PUBLICATIONS

Notice of Reasons for Refusal dated May 7, 2019 of counterpart Japanese Application No. 2015-081032 along with an English translation.

*Primary Examiner* — Stephen Holwerda
(74) *Attorney, Agent, or Firm* — DLA Piper LLP (US)

(57) ABSTRACT

A robot directly recognizes an emotion of a user and controls an operation in a conversation by exchanging messages in the conversation between the user and the robot is provided. The robot is able to communicate with a mobile terminal carried by the user and includes: a storage unit configured to store a plurality of applications to control motions of the robot in advance; a reception unit configured to receive a message for a conversation with the robot which is transmitted from the mobile terminal; a selection unit configured to select one application from the plurality of applications based on instruction information included in the message; and a control unit configured to control a mechanism to actuate the robot based on the selected application.

7 Claims, 6 Drawing Sheets

(51) Int. Cl.
    *G06F 17/27*     (2006.01)
    *B25J 13/00*     (2006.01)
    *G06N 3/00*     (2006.01)

(56) References Cited

U.S. PATENT DOCUMENTS

| | | | | |
|---|---|---|---|---|
| 2003/0088336 | A1* | 5/2003 | Osawa | A63H 3/28 700/245 |
| 2005/0165508 | A1* | 7/2005 | Kanda | G05D 1/0251 700/245 |
| 2007/0208569 | A1* | 9/2007 | Subramanian | G10L 19/0018 704/270 |
| 2008/0077277 | A1* | 3/2008 | Park | G06N 3/008 700/245 |
| 2009/0144366 | A1* | 6/2009 | Lyle | G06Q 10/107 709/204 |
| 2012/0084655 | A1 | 4/2012 | Gallagher et al. | |
| 2012/0185254 | A1* | 7/2012 | Biehler | H04L 67/125 704/270 |
| 2014/0074945 | A1* | 3/2014 | Kanevsky | A61B 5/165 709/206 |
| 2014/0085181 | A1* | 3/2014 | Roseway | G06F 1/1652 345/156 |
| 2014/0188276 | A1* | 7/2014 | Roseway | A61M 21/00 700/258 |
| 2014/0249673 | A1* | 9/2014 | Lin | B25J 9/163 700/246 |
| 2016/0352895 | A1* | 12/2016 | Son | G06F 17/289 |

FOREIGN PATENT DOCUMENTS

| | | |
|---|---|---|
| JP | 2003-157221 A | 5/2003 |
| JP | 2004-167627 A | 6/2004 |
| JP | 2005-184304 A | 7/2005 |
| JP | 2005-342862 A | 12/2005 |
| JP | 2007-44798 A | 2/2007 |
| JP | 2007-110199 A | 4/2007 |
| JP | 2008-104707 A | 5/2008 |
| JP | 2008-107673 A | 5/2008 |
| JP | 2009-268028 A | 11/2009 |
| JP | 2014-235533 A | 12/2014 |
| WO | 2004/031878 A1 | 4/2004 |

* cited by examiner

FIG. 5

| EMOTION PATTERN | LOCATION | | EMOTION | |
|---|---|---|---|---|
| | DATE AND TIME | POSITION | ILLUSTRATION | MEANING |
| PLEASURE | DD/MM/YY hh:mm | (X1, Y1) | ♡ | HAPPINESS, FONDNESS, HEART |
| ANGER | DD/MM/YY hh:mm | (X2, Y2) | 卅 | ANGER, IRRITATION |
| SADNESS | DD/MM/YY hh:mm | (X3, Y3) | ~γ | TEAR, SADNESS, BOOHOO |
| HAPPINESS | DD/MM/YY hh:mm | (X4, Y4) | 𝄞♪ | MUSICAL NOTES, HAPPINESS, MUSIC |
| PLEASURE | DD/MM/YY hh:mm | (X5, Y5) | ◡ | WHEE, PLEASURE |
| ⋮ | ⋮ | ⋮ | ⋮ | ⋮ |

ROBOT, ROBOT CONTROL METHOD, AND ROBOT SYSTEM

TECHNICAL FIELD

This disclosure relates to a robot, a robot control method, and a robot system and more particularly to a robot, a robot control method, and a robot system using a message transmitted from a mobile terminal of a user.

BACKGROUND

Techniques of allowing a robot to converse with a user for the purpose of communication with the user are known. In most of such techniques, conversations are carried out by selecting an operation pattern of a robot based on speech recognition of speech uttered by a user and causing the robot to utter speech or to move hands and feet based on the selected operation pattern.

A technique for such speech recognition is disclosed in Japanese Unexamined Patent Application Publication No. 2008-107673. This relates to a technique of allowing a conversation robot to analyze speech uttered by a user, calculate an emotion parameter, and perform speech output and the like based on a scenario of speech, a look, or a motion determined depending on the calculated emotion parameter.

However, in the technique disclosed in JP '673, since the emotion parameter is calculated by calculating a parameter from appearance frequencies of minute high frequencies and low frequencies in the speech input from the user, there is a problem in that it is difficult to uniformly cope with a variation in expression for each emotion of a user and a user emotion recognition rate is low.

Therefore, it could be helpful to control operation of a robot in a conversation by exchanging messages to improve a user emotion recognition rate in the conversation between the user and the robot.

SUMMARY

We thus provide a robot that is able to communicate with a mobile terminal carried by a user, the robot including: a storage unit configured to store a plurality of applications to control motions of the robot in advance; a reception unit configured to receive a message for a conversation with the robot which is transmitted from the mobile terminal; a selection unit configured to select one application from the plurality of applications based on instruction information included in the message; and a control unit configured to control a mechanism to actuate the robot based on the selected application, wherein the instruction information is information incidental to illustration information or screen information transmitted from the user to the robot.

The incidental information may include illustration information or semantic information incidental to the illustration information, the robot may further include an emotion recognizing unit configured to recognize an emotion of the user as emotion information based on the illustration information or the semantic information, and the selection unit may select one application from the plurality of applications based on the recognized emotion information of the user.

The incidental information may be image information or incidental information on a date and a position incidental to the image information, the robot may further include an image recognizing unit configured to recognize a location of the user as location information based on the image information and the incidental information, and the selection unit may select one application from the plurality of applications based on the location information.

The instruction information may include information indicating an emotion of the user, the robot may further include an emotion classifying unit configured to classify the emotion of the user into emotion pattern information based on the indicating information, the storage unit may store the emotion pattern information and the emotion information or the location information recognized within a predetermined time in correlation with each other, and the selection unit may select one application from the plurality of applications based on the emotion pattern information correlated with the emotion information or the location information.

The instruction information may include information designating a predetermined celebrity from the user, the reception unit may receive motion information from a database server that provides the motion information of the designated celebrity via the network based on the designation information, and the selection unit may select one application from the plurality of applications based on the motion information.

The motion information may be motion information associated with the celebrity whose appearance frequency over the Internet is a predetermined ranking from a highest rank.

We also provide a robot control method of a robot that is able to communicate with a mobile terminal carried by a user, the robot control method including: a step of storing a plurality of applications to control motions of the robot in advance; a step of receiving a message for a conversation with the robot which is transmitted from the mobile terminal; a step of selecting one application from the plurality of applications based on instruction information included in the message; and a step of controlling a mechanism to actuate the robot based on the selected application, wherein the instruction information is information which is incidental to illustration information or screen information transmitted from the user to the robot.

We further provide a robot system including a mobile terminal carried by a user, a robot able to communicate with the mobile terminal, and an application market server that provides a plurality of applications, wherein the application market server includes provision means configured to provide one or a plurality of applications to control motions of the robot to the robot, the robot includes: storage means configured to store the provided applications in advance; reception means configured to receive a message for a conversation with the robot which is transmitted from the mobile terminal; selection means configured to select one application from the plurality of applications based on instruction information included in the message; and control means configured to control a mechanism to actuate the robot based on the selected application, and the instruction information is information which is incidental to illustration information or screen information transmitted from the user to the robot.

According to the robot, the robot control method, and the robot system, it is possible to directly recognize emotions of a user based on incidental information of illustration information and image information in a message by transmitting the message for a conversation with the robot from a mobile terminal of the user. Accordingly, since an emotion of a user can be more accurately recognized, it is possible to achieve an improvement in a user emotion recognition rate.

BRIEF DESCRIPTION OF THE DRAWINGS

FIG. 5 is a data structure diagram illustrating an example of a correlation between emotion pattern information and location information and emotion information.

EXPLANATION OF REFERENCES

Figure 1:
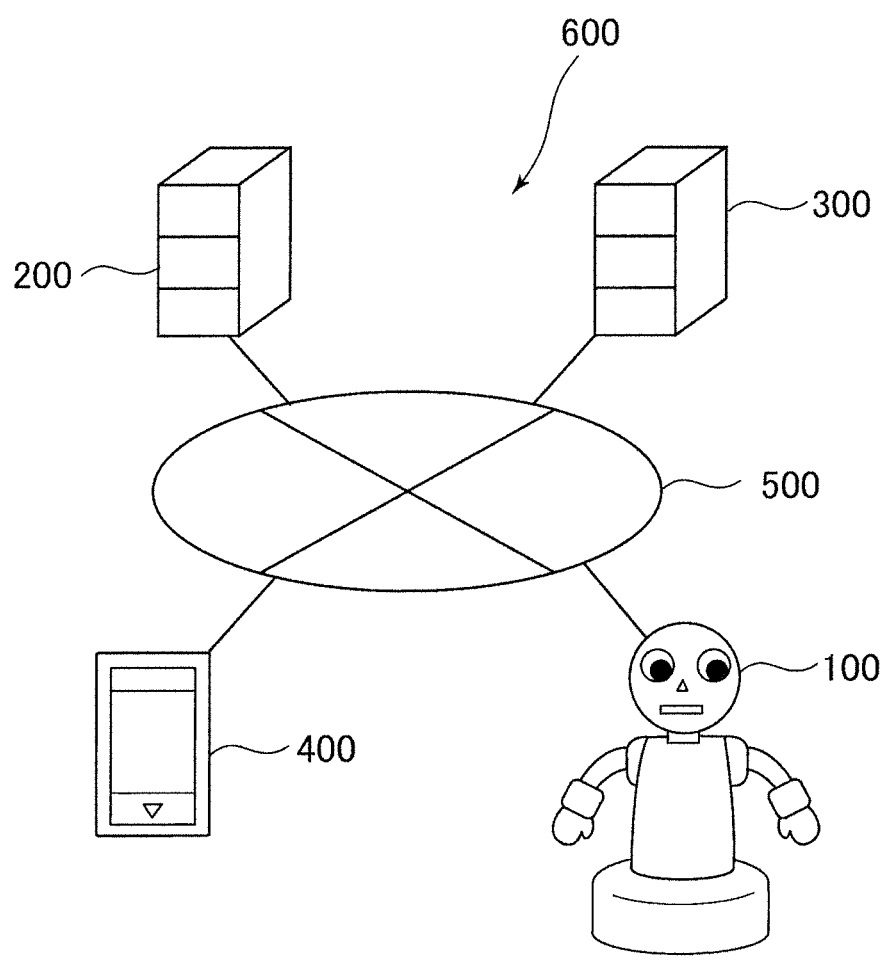
FIG. 1 is a system diagram illustrating a system configuration of a robot system.

100 Robot
110 Reception unit
115 Transmission unit
120 Selection unit
125 Image recognizing unit
130 Emotion classifying unit
135 Emotion recognizing unit
140 Storage unit
145 Application
150 Control unit
155 Speech input unit
160 Speech output unit
165 Interface
170 Power supply unit
175 Imaging unit
200 Application market server
300 Database server
400 Mobile terminal of user
500 Network
600 Robot system
700 Correlation information
701 Emotion pattern information
703 Date and time information
704 Position information
706 Illustration information
707 Semantic information

DETAILED DESCRIPTION

Hereinafter, an example will be described with reference to the accompanying drawings.

Example

Summary

FIG. 1 is a system diagram illustrating a system configuration of a robot system.

As illustrated in FIG. 1, a robot system 600 includes an application market server 200, a database server 300, a mobile terminal 400 of a user, and a robot 100, and the application market server 200 and the database server 300 are connected to the mobile terminal 400 of the user and the robot 100 via a network 500 to communicate with each other.

The mobile terminal 400 of the user and the robot 100 constitute a system capable of performing exchanging of messages, that is, so-called chatting, using a general instant messaging system. The robot 100 receives a message transmitted from the mobile terminal 400 of the user via the network 500. The robot selects an application based on instruction information included in the received message and operates based on the selected application. Since the application can be downloaded and installed in the mobile terminal 400 of the user from the application market server 200 in response to a request of the user, it is possible to realize a versatile operation of the robot.

Configuration

A configuration of the robot 100 will be described below in detail.

Figure 2:
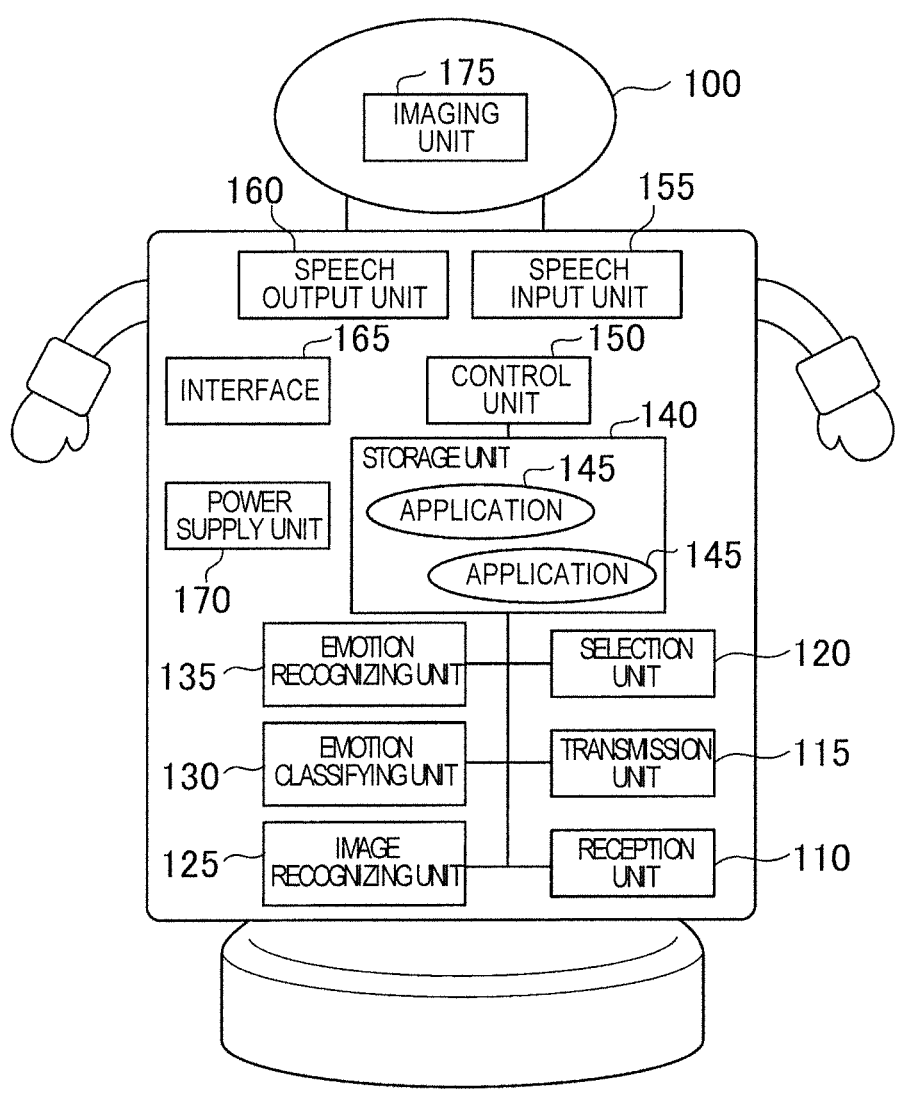
FIG. 2 is a block diagram illustrating a functional configuration of a robot.

FIG. 2 is a block diagram illustrating a functional configuration of the robot 100. As illustrated in FIG. 2, the robot 100 includes a reception unit 110, a transmission unit 115, a selection unit 120, an emotion recognizing unit 135, an emotion classifying unit 130, an image recognizing unit 125, a storage unit 140, applications 145, a control unit 150, a speech input unit 155, a speech output unit 160, an interface 165, a power supply unit 170, and an imaging unit 175.

The reception unit 110 has a function of communicating with the mobile terminal 400 of the user, the application market server 200, or the database server 300 via the network 500 and receiving a message, an application or other information transmitted from the mobile terminal 400 of the user or the like. Communication may be executed in any one of a wired manner and a wireless manner, and any communication protocol may be used as long as communication is enabled.

A message received by the reception unit 110 includes instruction information for the robot 100. The instruction information refers to information for designating one application 145 to be instructed among a plurality of applications 145 stored in the storage unit 140 and input information for performing processing of the designated application 145. Input information includes illustration information, semantic information which is incidental to the illustration information, screen information, incidental information on a date and a position which is incidental to the screen information, information indicating an emotion of a user, or information designating a predetermined celebrity.

Illustration information refers to illustration information transmitted from the mobile terminal 400 of a user to the robot 100. Typically, illustration information refers to a stamp used for the instant messaging system. Semantic information incidental to the illustration information refers to, for example, text information indicating a stamp, which is given to the stamp. When the illustration is a heart, the text information is a character string indicating a meaning sensed from the illustration such as goodness, pleasure, and love.

Image information refers to photograph data transmitted from the mobile terminal 400 of the user to the robot 100. Photograph data may be an image captured by the mobile terminal 400 or may be an image captured by a camera or another mobile terminal. Incidental information on a date, which is incidental to the image information, refers to information on a date and a time at which the photograph data is acquired. Incidental information on a position refers to position information at the time of imaging, for example, latitude and longitude information.

Information indicating an emotion of the user refers to information indicating emotions such as pleasure and sadness felt by the user. The information indicating an emotion may be text information input by the user based on an emotion or may be speech information on speech uttered by the user.

Information designating a predetermined celebrity refers to information indicating a target celebrity using all or a part of a name or an alias of the celebrity to acquire motion information of the celebrity. Specifically, a predetermined celebrity refers to a person registered in the database server 300 among persons having a plurality of fans such as TV personalities, artists, and athletes. Motion information of a predetermined celebrity may be features of a physical motion of the celebrity in the past or may be features of speech uttered by the celebrity in the past. The motion information may include a feature of which an appearance frequency over the Internet is within a predetermined ranking from the highest rank among the features.

The features of a physical motion and the features of speech may be calculated by accumulating information on physical motions and speech of the celebrity in the past for a predetermined period and calculating a greatest common divisor in a minimum unit of meaning from the accumulated information.

The transmission unit 115 has a function of performing communication with the mobile terminal 400 of the user, the application market server 200, or the database server 300 and transmitting image information or a message to the mobile terminal 400 of the user, the application market server 200, or the database server 300. This communication is the same as in the reception unit 110.

The selection unit 120 serves to select one application 145 from a plurality of applications 145 based on instruction information. The selection unit 120 selects one application 145 based on emotion pattern information correlated with emotion information or location information. When there are a plurality of pieces of emotion pattern information correlated with one piece of emotion information, the emotion pattern information having the largest number of pieces of information may be selected. When a plurality of pieces of emotion pattern information are correlated with each piece of emotion information and the numbers of pieces of emotion pattern information are the same, none of them are employed or priorities may be given to the pieces of emotion pattern information and the emotion pattern information may be employed based on the priorities.

The image recognizing unit 125 has a function of recognizing a location of a user as location information based on image information and incidental information on a date and a position, which is incidental to the image information. For example, a pattern matching method, a statistical identification method, or a structural identification method can be used to recognize the image information.

The emotion classifying unit 130 has a function of classifying an emotion of the user into emotion pattern information from the information indicating an emotion of the user. Specifically, the emotion classifying unit 130 recognizes the information indicating an emotion as character string information and performs pattern matching with the emotion pattern information stored in the storage unit 140. When the matching succeeds, the matched emotion pattern information is set and classified. The emotion pattern information may be patterns of emotions such as pleasure, anger, sadness, and happiness or dynamic changes thereof.

The emotion recognizing unit 135 has a function of recognizing an emotion of the user as emotion information from illustration information or semantic information incidental to the illustration information. Specifically, the emotion recognizing unit 135 performs matching with emotion information stored in the storage unit 140. When the matching succeeds, the emotion is determined to be an emotion stored in the storage unit. The stored emotion information may be character string information such as pleasure, anger, sadness, and happiness or may be image pattern information indicating emotions such as pleasure, anger, sadness, and happiness.

The storage unit 140 has a function of storing an application 145 required for the robot to move. The storage unit 140 stores a correlation between emotion pattern information and location information or emotion information recognized within a predetermined time. The storage unit 140 stores various programs and data used to control the robot 100. The storage unit 140 is embodied by a small-sized recording medium such as a flash memory.

The application 145 performs a process to actuate the robot 100 based on instruction information included in a message and outputs a command to the control unit 150. In FIG. 2, two applications 145 are illustrated for the purpose of simplification of explanation, but more applications may be present.

The application 145 is also an application registered in the application market server 200. The application market server 200 provides an online service for distribution of an application. Specifically, the application market server 200 can register an application prepared by a developer and the robot 100 can download the registered application in response to a request from the user. The billing system for use of an online service in the application market server 200 may be a download billing system or a flat billing system.

The control unit 150 is a processor having a function of controlling mechanisms to actuate the robot 100. Specifically, the control unit 150 receives a command output from the application 145 stored in the storage unit 140 and controls the mechanisms such that the mechanisms operate based on the received command. The mechanisms refer to structural portions having a driving unit with a degree of freedom such as a body, an arm, a head, an eyeball, an eyelid, or a mouth or a structural portion such as the speech output unit 160 that outputs speech.

The speech input unit 155 has a function of allowing the robot 100 to acquire ambient sound in addition to speech uttered by a user. The speech input unit 155 is specifically embodied by a monaural microphone or a stereo microphone.

The speech output unit 160 has a function of allowing the robot 100 to output speech. The speech may be a speech output based on synthesis of speech or a speech output based on speech recorded by a voice actor or actress.

The interface 165 communicates with another terminal or medium in a wireless or wired manner. Specifically, the interface 165 refers to a connecting device such as wireless fidelity (WiFi), a high-definition multimedia interface (HDMI), a Universal Serial Bus (USB), a power supply connector, or an inter-integrated circuit (I2C).

The power supply unit 170 supplies electricity of the robot 100.

The imaging unit 175 has a function of recording a still image or a moving image of nearby persons or scenes captured through a lens by the robot 100.

The functional configuration of the robot 100 has been described above.

An example in which the mobile terminal 400 of a user transmits a message for a conversation with the robot 100 and the robot operates based on the message will be described below with reference to FIGS. 3 and 4.

Figure 3:
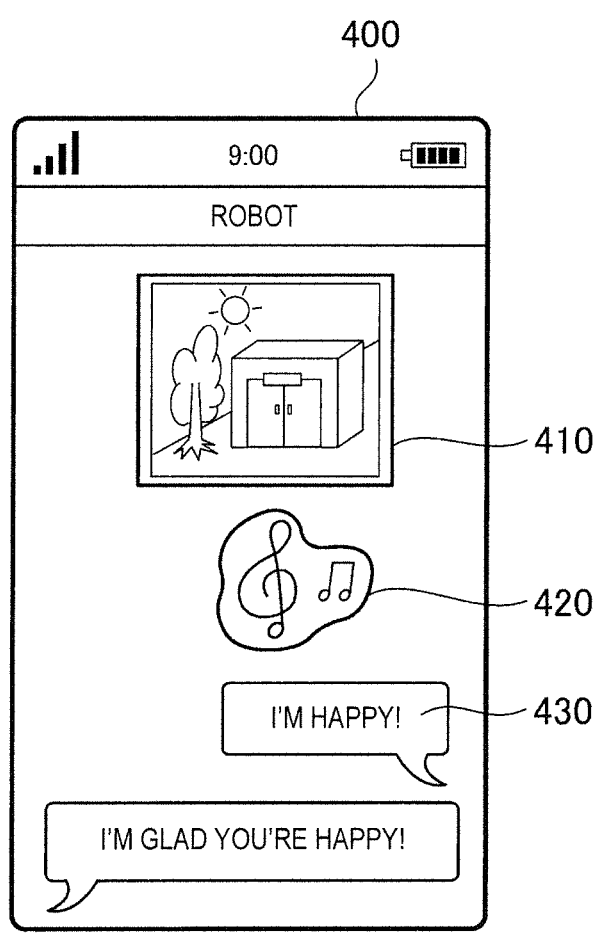
FIG. 3 is a schematic diagram illustrating exchange of a conversation between a robot and a user.

FIG. 3 is a diagram illustrating an example of a screen displayed on a display unit of the mobile terminal 400 of a user in a conversation between the user and the robot 100. The user uses an instant messaging system installed in the mobile terminal 400 of the user and transmits photograph data 410 obtained by imaging an appearance of a store in which the user has been present with the mobile terminal 400 of the user to the robot 100 for the purpose of notifying the robot 100 of a current location of the user. The robot 100 can directly recognize a date and a time at which the user was present in the store and a position of the store from incidental information on a date and time and a position incidental to the photograph data 410.

To notify the robot 100 of a happy emotion at the store, the user transmits an illustration 420 in which musical note symbols corresponding to the emotion are marked to the robot 100. For example, when the semantic information incidental to the illustration 420 is "I'm happy," the robot 100 can directly recognize the happy emotion felt by the user based on the semantic information.

In addition to the image information 410 and the illustration information 420, a text message 420 is transmitted to the robot 100 as information indicating an emotion of the user within a predetermined time. The predetermined time may be 30 seconds, one minute, or five minutes before or after the robot 100 receives the information indicating an emotion.

When the robot 100 receives the image information 410, the illustration information 420, and the text message 430, the location information incidental to the image information 410, the emotion information incidental to the illustration information 420, and the information indicating an emotion are stored in correlation with each other. By this storage, the robot 100 can recognize that the user feels happy when the user is located at a position indicated by the location information incidental to the image information 410 and a trend of an emotion that the user feels happy when the illustration information 420 is transmitted. By this recognition, the robot 100 can automatically perform a motion corresponding to the user's emotion when the same illustration information or image information on the same place is received later.

The robot 100 transmits a message matching the emotion of the user recognized based on the illustration 420 or the text message 430 such as "I'm glad that you're happy!" to the mobile terminal 400 of the user based on the received illustration 420 or the received text message 430.

The robot 100 may transmit a message when it is determined that the user is not near from a still image or a moving image captured by the imaging unit 175 of the robot 100 or the location information incidental to the image information transmitted within a predetermined time, and may output a message by speech from the speech output unit 160 to directly deliver the message to the user in addition to transmission of the message or instead of transmission of the message when it is determined that the user is near.

Figure 4:
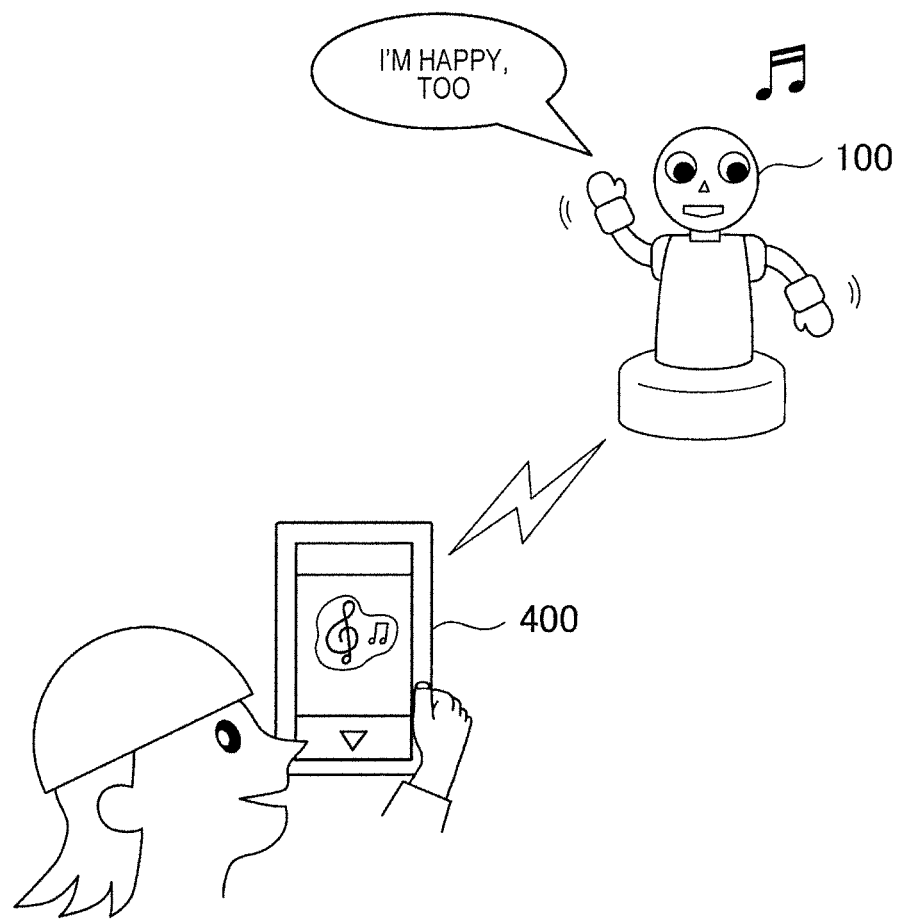
FIG. 4 is a schematic diagram illustrating an operation of a robot.

FIG. 4 is a schematic diagram illustrating exchange of a conversation between the robot and a user.

When the user is near the robot 100 or remote therefrom, the robot 100 performs transmission of a message, speech output, or motions such as gestures based on the message transmitted from the mobile terminal 400 of the user and thus the user can converse with the robot 100. Accordingly, when the user transmits a message to the robot 100, a motion corresponding thereto is returned from the robot 100 and thus it is possible to give the user a feeling as if the user were conversing with a person or a living thing, thereby achieving communication with the robot 100.

At this time, when a message designating a predetermined celebrity was transmitted in the past, the robot may perform a motion corresponding to the motion information of the predetermined celebrity. Accordingly, the user can have a feeling of communicating with a counterpart of the user's choosing through communication with the robot 100, for example, by seeing or hearing a motion or speech of the robot 100 matching features of the motion or speech of a TV personality who the user likes.

Data

A correlation between emotion pattern information, location information, and emotion information used in the robot 100 according to this example will be described below.

FIG. 5 is a conceptual diagram of data illustrating an example of correlation information 700 stored in the storage unit 140 of the robot 100.

As illustrated in FIG. 5, the correlation information 700 is information in which emotion pattern information 701, location information 702, date and time information 703 and position information 704 in the location information 702, emotion information 705, and illustration information 706 and semantic information 707 in the emotion information 705 are correlated with each other. The correlation information 700 is not particularly limited as long as it is information capable of specifying a location and an emotion of the user using the robot 100, and may include information other than that described above.

The emotion pattern information 701 may be expressed in any form as long as it can express an emotion pattern and may be expressed, for example, using numerals, hiragana, katakana, Chinese characters, and other symbols.

The date and time information 703 is date and time information incidental to an image received within a predetermined time from a time at which information indicating an emotion incidental to the emotion pattern information is received. The date and time information may be expressed in any form as long as it can express date and time.

The position information 704 is position information incidental to an image received within a predetermined time from a time at which the information indicating an emotion incidental to the emotion pattern information is received. The position information may be expressed in any form as long as it can express a position.

The illustration information 706 is image data of an illustration received within a predetermined time from a time at which information indicating an emotion incidental to the emotion pattern information is received. The image data may be a still image or a moving image.

The semantic information 707 is semantic information of an illustration received within a predetermined time from a time at which information indicating an emotion incidental to the emotion pattern information is received.

Operation

An operation of a communication system according to this example will be described below.

An operation of the robot 100 will be described with reference to FIG. 6.

Figure 6:
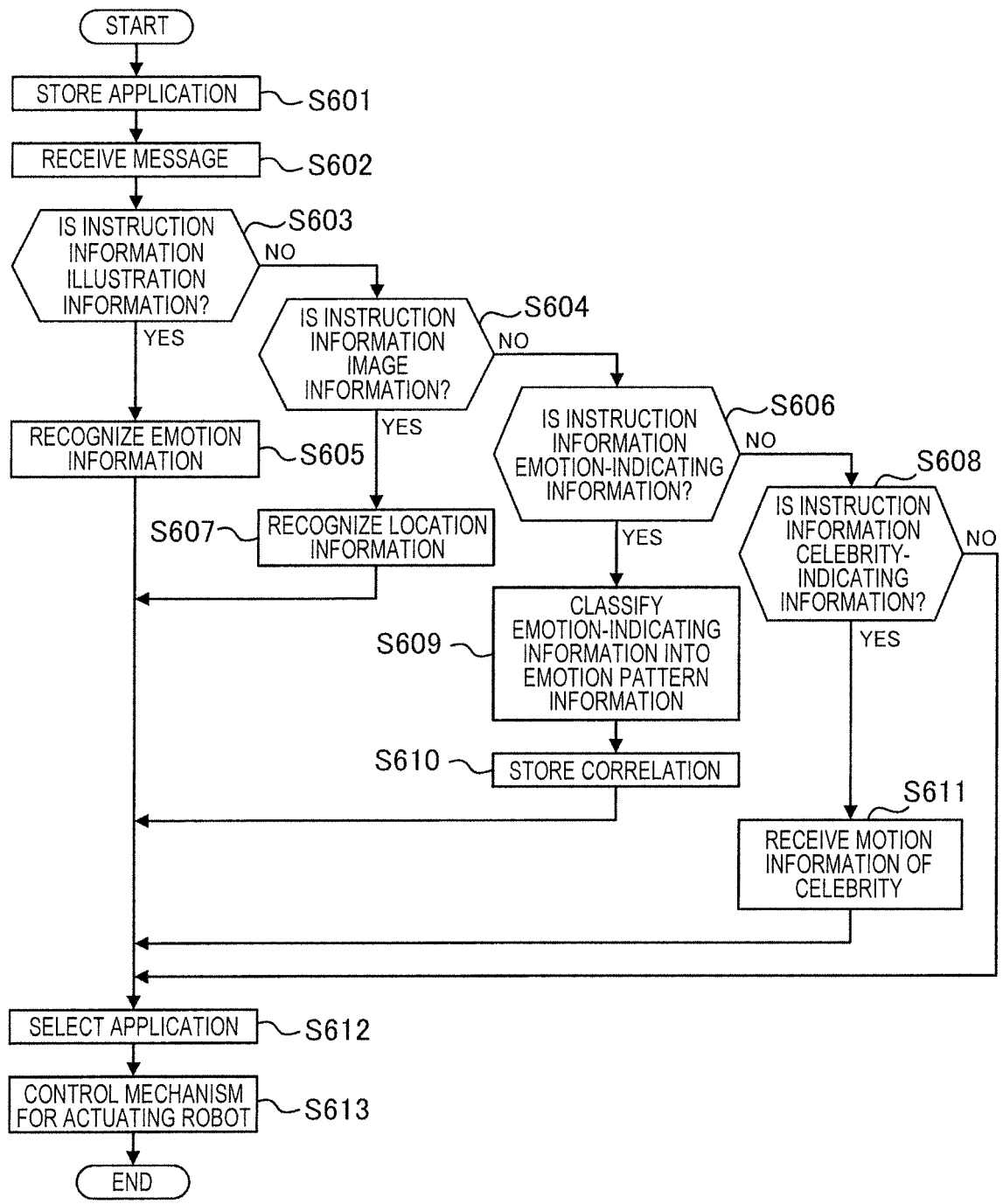
FIG. 6 is a flowchart illustrating an operation of a robot.

FIG. 6 is a flowchart illustrating an operation of the robot 100.

The storage unit 140 stores a plurality of applications 145 to control motions of the robot in advance (Step S601).

The reception unit 110 receives a message for a conversation transmitted from the mobile terminal 400 of a user (Step S602). The reception unit 110 delivers instruction information included in the received message to the selection unit 120, the image recognizing unit 125, the emotion classifying unit 130, or the emotion recognizing unit 135.

When the delivered instruction information is illustration information or semantic information incidental to the illustration information (YES in Step S603), the emotion recognizing unit 135 performs matching with emotion information stored in the storage unit 140 based on the illustration information or the semantic information. When the matching succeeds, the emotion recognizing unit 135 determines that the emotion is stored and recognizes emotion information (Step S605). The recognized emotion information is delivered to the selection unit 120.

When the delivered instruction information is image information or incidental information on a date and time and a position incidental to the image information (YES in Step S604), the image recognizing unit 125 recognizes location information of the user based on image information and incidental information (Step S607). The recognized location information is delivered to the selection unit 120.

When the delivered instruction information is information indicating an emotion (YES in Step S606), the emotion classifying unit 130 recognizes the information indicating an emotion as character string information and performs pattern matching with emotion pattern information stored in the storage unit 140. When the matching succeeds, the matched emotion pattern information is classified by setting (Step S609). Then, the emotion classifying unit 130 stores the classified emotion pattern information and emotion information or location information recognized within a predetermined time in correlation with each other (Step S610). The stored correlation information is delivered to the selection unit 120.

When the delivered instruction information is information designating a predetermined celebrity (YES in Step S608), the reception unit 110 requests motion information of the designated celebrity from the database server 300. The reception unit 110 receives the motion information from the database server 300 (Step S611).

The selection unit 120 selects one application 145 from a plurality of applications 145 stored in the storage unit 140 based on the delivered information designating an application and the input information such as the recognized information and the stored information (Step S612). The selected application 145 performs processing based on the input information.

The control unit 150 controls the mechanisms to actuate the robot 100 based on the processing result of the selected application 145 (Step S613) and ends the routine.

The operation of the robot 100 has been described above.

Conclusion

According to the robot, the robot control method, and the robot system, by transmitting a message for a conversation with the robot from a mobile terminal of a user while giving versatility to the operation of the robot, it is possible to directly recognize emotions of the user and to control an operation such as speech output or movement of hands or feet in a conversation with the robot. Accordingly, it is possible to enable a conversation with the robot by more accurately recognizing emotions of a user and giving the user a feeling as if the user were conversing with a person or a living thing.

While robots, control methods and systems have been described above with reference to an example and drawings, the example is a representative example and this disclosure is not limited to the example.

Supplement

An example may provide a robot program of a robot that is able to communicate with a mobile terminal carried by a user, the robot program including: a storage function of storing a plurality of applications to control motions of the robot in advance; a receiving function of receiving a message for a conversation with the robot transmitted from the mobile terminal; a selection function of selecting one application from the plurality of applications based on instruction information included in the message; and a control function of controlling a mechanism to actuate the robot based on the selected application, wherein the instruction information is information which is incidental to illustration information or screen information transmitted from the user to the robot.

What is claimed is:

1. A robot that communicates with a mobile terminal carried by a user, the robot comprising:
   a storage configured to store a plurality of applications to control a motion of the robot in advance;
   a receptor configured to receive a message for a conversation with the robot which is transmitted from the mobile terminal;
   a selector configured to select one application from the plurality of applications based on instruction information included in the message; and
   a controller configured to control a mechanism to actuate the robot based on the selected application,
   wherein the instruction information is information incidental to illustration information or information incidental to screen information transmitted from the user to the robot and the instruction information includes information indicating an emotion of the user,
   the incidental information includes semantic information incidental to the illustration information,
   the robot further comprises:
   an emotion recognizer configured to recognize an emotion of the user as emotion information based on the illustration information or the semantic information, and
   an emotion classifier configured to classify the emotion of the user into emotion pattern information based on the indicating information,
   the storage stores the emotion pattern information and the emotion information or location information recognized within a predetermined time in correlation with each other, and
   the selector selects one application from the plurality of applications based on the recognized emotion information of the user, and
   the selector further selects one application from the plurality of applications based on the emotion pattern information correlated with the emotion information or the location information.

2. The robot according to claim 1, wherein the incidental information is incidental information on a date and a position incidental to image information,
   the robot further comprises an image recognizer configured to recognize a location of the user as location information based on the image information and the incidental information, and
   the selector selects one application from the plurality of applications based on the location information.

3. The robot according to claim 1, wherein the instruction information includes information designating a predetermined celebrity from the user,
   the receptor receives motion information from a database server that provides the motion information of the designated celebrity via network based on the designation information, and
   the selector selects one application from the plurality of applications based on the motion information.

4. The robot according to claim 3, wherein the motion information is motion information associated with the celebrity whose appearance frequency over the Internet is a predetermined ranking from a highest rank.

5. The robot according to claim 2, wherein the instruction information includes information indicating an emotion of the user,
   the robot further comprises an emotion classifier configured to classify the emotion of the user into emotion pattern information based on the indicating information, the storage stores the emotion pattern information and the emotion information or the location information recognized within a predetermined time in correlation with each other, and the selector selects one application from the plurality of applications based on the emotion pattern information correlated with the emotion information or the location information.

6. A robot control method of a robot that communicates with a mobile terminal carried by a user, the robot control method including the steps of:

storing a plurality of applications to control a motion of the robot in advance;

receiving a message for a conversation with the robot which is transmitted from the mobile terminal;

selecting one application from the plurality of applications based on instruction information included in the message; and controlling a mechanism to actuate the robot based on the selected application, wherein the instruction information is information incidental to illustration information or information incidental to screen information transmitted from the user to the robot and the instruction information includes information indicating an emotion of the user, the incidental information includes semantic information incidental to the illustration information, the robot control method further including the steps of:

recognizing an emotion of the user as emotion information based on the illustration information or the semantic information, and classifying the emotion of the user into emotion pattern information based on the indicating information, wherein the storing step further includes storing the emotion pattern information and the emotion information or location information recognized within a predetermined time in correlation with each other;

the selecting step further includes selecting one application from the plurality of applications based on the recognized emotion information of the user, and the selecting step further includes selecting one application from the plurality of applications based on the emotion pattern information correlated with the emotion information or the location information.

7. A robot system comprising a mobile terminal carried by a user, a robot that communicates with the mobile terminal, and an application market server that provides a plurality of applications, wherein the application market server includes a provider configured to provide one or a plurality of applications to control a motion of the robot to the robot, the robot includes:

a storage configured to store the provided applications in advance;

a receptor configured to receive a message for a conversation with the robot which is transmitted from the mobile terminal;

a selector configured to select one application from the plurality of applications based on instruction information included in the message; and a controller configured to control a mechanism to actuate the robot based on the selected application, and the instruction information is information incidental to illustration information or information incidental to screen information transmitted from the user to the robot and the instruction information includes information indicating an emotion of the user, the incidental information includes semantic information incidental to the illustration information, the robot further comprises:

an emotion recognizer configured to recognize an emotion of the user as emotion information based on the illustration information or the semantic information; and an emotion classifier configured to classify the emotion of the user into emotion pattern information based on the indicating information, the storage stores the emotion pattern information and the emotion information or location information recognized within a predetermined time in correlation with each other, and the selector selects one application from the plurality of applications based on the recognized emotion information of the user, and the selector further selects one application from the plurality of applications based on the emotion patter information correlated with the emotion information or the location information.

* * * * *